(12) United States Patent
Bai et al.

(10) Patent No.: US 12,097,621 B2
(45) Date of Patent: Sep. 24, 2024

(54) CENTER OF MASS TRAJECTORY GENERATING METHOD, ROBOT AND COMPUTER-READABLE STORAGE MEDIUM

(71) Applicant: UBTECH ROBOTICS CORP LTD, Shenzhen (CN)

(72) Inventors: Jie Bai, Shenzhen (CN); Ligang Ge, Shenzhen (CN); Chunyu Chen, Shenzhen (CN); Yizhang Liu, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 396 days.

(21) Appl. No.: 17/726,548

(22) Filed: Apr. 22, 2022

(65) Prior Publication Data
US 2022/0388169 A1    Dec. 8, 2022

Related U.S. Application Data

(63) Continuation of application No. PCT/CN2021/125400, filed on Oct. 21, 2021.

(30) Foreign Application Priority Data

May 26, 2021  (CN) .......................... 202110577214.5

(51) Int. Cl.
*B25J 9/16*    (2006.01)
*B62D 57/032*  (2006.01)
*G06F 11/10*   (2006.01)
*G06F 17/10*   (2006.01)
*G06F 30/17*   (2020.01)
*G06F 30/20*   (2020.01)

(52) U.S. Cl.
CPC ................... *B25J 9/1664* (2013.01)

(58) Field of Classification Search
None
See application file for complete search history.

(56) References Cited

U.S. PATENT DOCUMENTS 11,061,407  B2 *  7/2021  Xiong ................... G05D 1/0272
11,602,848  B2 *  3/2023  Chen ....................... B25J 9/1694
2019/0196477 A1   6/2019  Xiong et al.

OTHER PUBLICATIONS

ISR for PCT/CN2021/125400.
Written opinions of ISA for PCT/CN2021/125400.
(Continued)

*Primary Examiner* — Jaime Figueroa
*Assistant Examiner* — Atticus A Cameron

(57) ABSTRACT

A method for generating a center of mass (CoM) trajectory includes determining an actual pose of a center of mass (CoM), a pose of a left foot, and a pose of a right pose of a robot; determining a first pose tracking vector of the robot according to the actual pose of the CoM and the pose of the left foot, and determining a second pose tracking vector of the robot according to the actual pose of the CoM and the pose of the right foot; and controlling a desired pose of the CoM of the robot to alternately track the pose of the left foot and the pose of the right foot, according to the first pose tracking vector and the second pose tracking vector, so as to generate a desired CoM trajectory of the robot.

20 Claims, 15 Drawing Sheets

(56) References Cited

OTHER PUBLICATIONS

Wang Liuqing et al., A gait pattern planning algorithm based on linear coupled oscillator model for humanoid robots, Journal of University of Science and Technology of China, vol. 44 Issue 10, pp. 795-803.

* cited by examiner

CENTER OF MASS TRAJECTORY GENERATING METHOD, ROBOT AND COMPUTER-READABLE STORAGE MEDIUM

CROSS REFERENCE TO RELATED APPLICATIONS

The present application is a continuation-application of International Application PCT/CN2021/125400, with an international filing date of Oct. 21, 2021, which claims foreign priority of Chinese Patent Application No. 202110577214.5, filed on May 26, 2021 in the China National Intellectual Property Administration of China, the contents of all of which are hereby incorporated by reference.

BACKGROUND

1. Technical Field

The present disclosure generally relates to robots, and particularly to a center of mass (CoM) trajectory generating method, a robot, and a computer-readable storage medium.

2. Description of Related Art

A key issue in humanoid robot research is to maintain walking stability while increasing walking speed. Generally, as the pace increases, the step length of a robot will also increase, which causes that the center of mass cannot be tracked, resulting in divergent gait, poor stability, and even a fall of the robot.

Therefore, there is a need to provide a method to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views. Obviously, the drawings in the following description are only some embodiments of the present disclosure. For those of ordinary skill in the art, other drawings can be obtained based on these drawings without creative labor.

DETAILED DESCRIPTION

Figure 1:
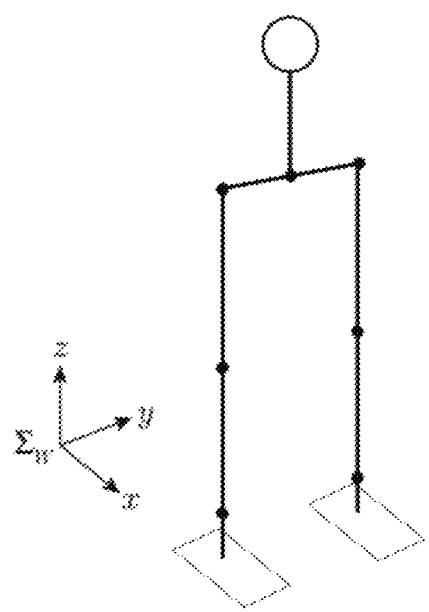
FIG. 1 is a schematic diagram of a bipedal robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
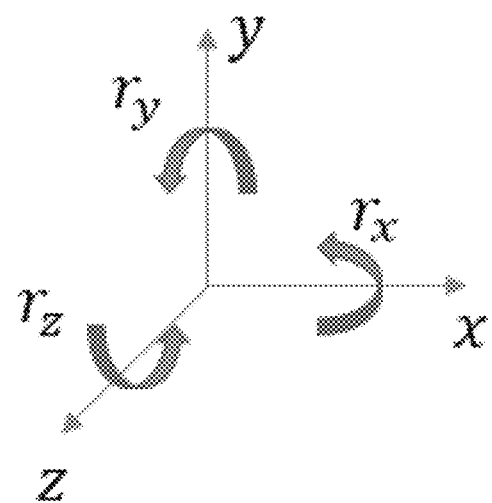
FIG. 2 is a schematic diagram of a world coordinate system established for the bipedal robot.

For convenience of description, in one embodiment, a world coordinate system $\Sigma_w$ as shown in FIG. 1 may be established. In this coordinate system, the x-axis extends along the walking direction of the robot and is parallel to the frontal axis running through the body of the robot horizontally from back to front, the y-axis is parallel to the sagittal axis running through the body of the robot horizontally from left to right, and the z-axis is parallel to the vertical axis running through the body of the robot vertically from top to bottom. FIG. 2 shows the corresponding relationship between the coordinate axes and the rotation direction. As shown in the figure, the direction of rotation around the x-axis is $r_x$, and the angle describing the magnitude of the rotation about the x-axis is referred to as a roll angle. The direction of rotation around the y-axis is $r_y$, and the angle describing the magnitude of the rotation about the y-axis is referred to as a pitch angle. The direction of rotation around the z-axis is $r_z$, and the angle describing the magnitude of the rotation about the z-axis is referred to as a yaw angle.

Figure 3:
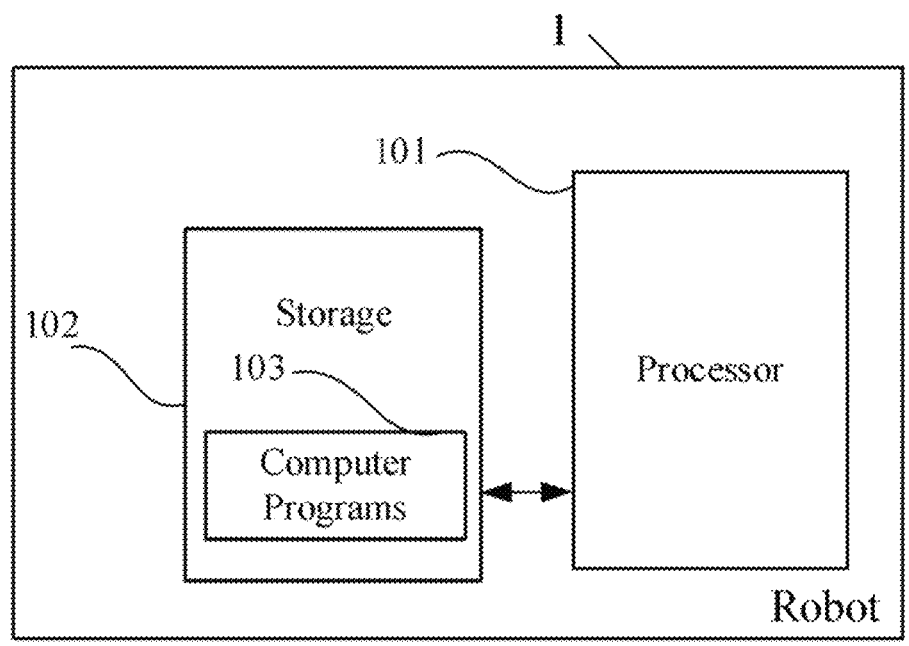
FIG. 3 is a schematic block diagram of the bipedal robot according to one embodiment.
Figure 4:
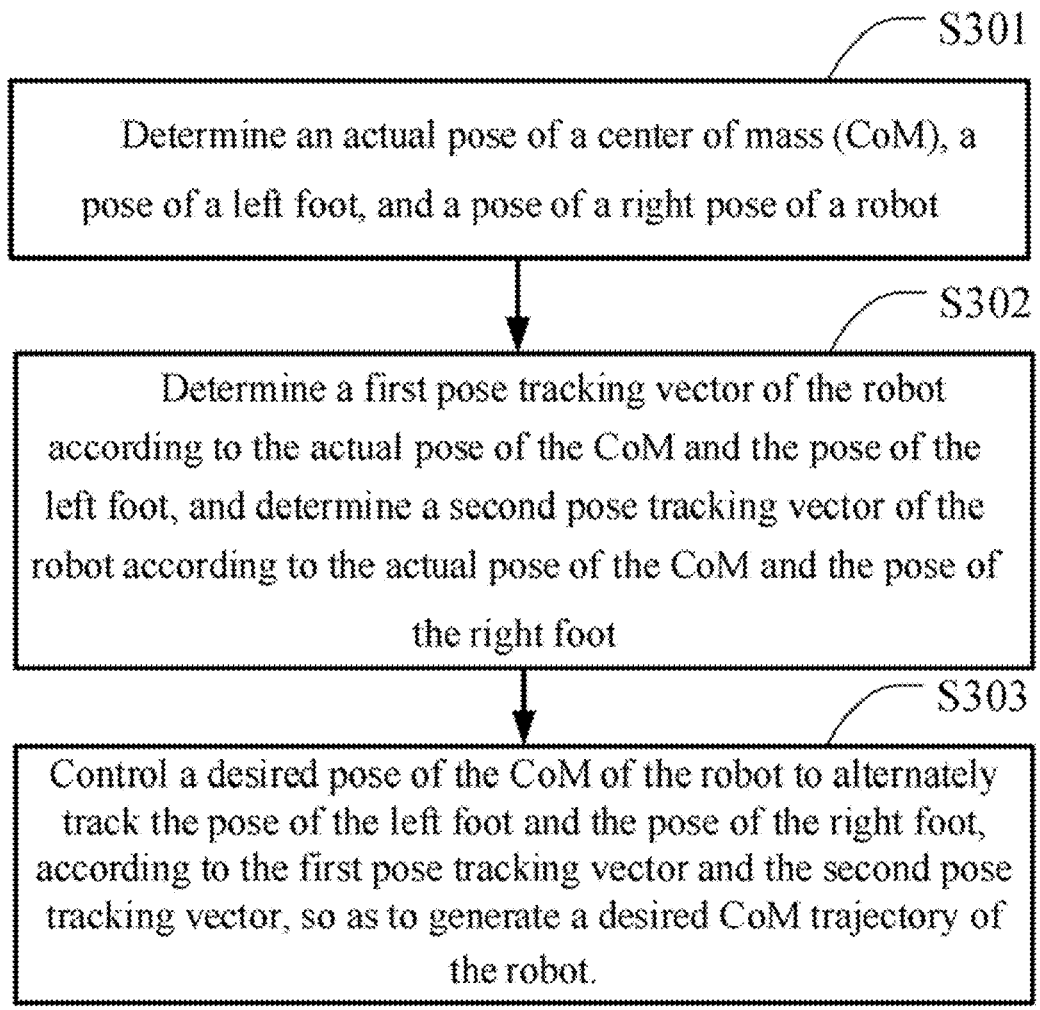
FIG. 4 is a flow chart of a method for controlling the bipedal robot according to one embodiment.

FIG. 3 shows a schematic block diagram of a robot according to one embodiment. The robot may include a processor 101, a storage 102, and one or more executable computer programs 103 that are stored in the storage 102. The processor 101 is electrically connected to the storage 105, and performs corresponding operations by executing the executable computer programs 103 stored in the storage 102. When the processor 101 executes the computer programs 103, the steps in the embodiments of the method for controlling the robot, such as steps S301 to S303 in FIG. 4 are implemented.

The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like.

The storage 102 may be an internal storage unit of the robot, such as a hard disk or a memory. The storage 102 may also be an external storage device of the robot, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 15:
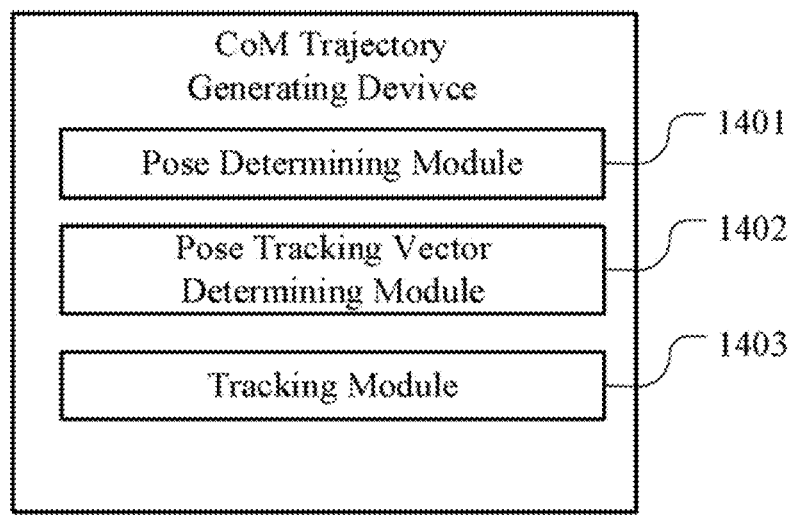
FIG. 15 is a schematic block diagram of a device for generating a CoM trajectory according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot. For example, the one or more computer programs 112 may be divided into a pose determining module, a pose tracking vector determining module, and a tracking module as shown in FIG. 15.

Referring to FIG. 4, in one embodiment, a method for generating a center of mass (CoM) trajectory may include the following steps S301 to S303.

Step S301: Determine an actual pose of a center of mass (CoM), a pose of a left foot, and a pose of a right pose of a robot.

The poses mentioned in the embodiments of the present disclosure all include a position and an attitude. The position is specified by an x-coordinate, a y-coordinate, and a z-coordinate in the coordinate system above, and the attitude is specified by the roll angle, pitch angle, and yaw angle.

Step S302: Determine a first pose tracking vector of the robot according to the actual pose of the CoM and the pose of the left foot, and determine a second pose tracking vector of the robot according to the actual pose of the CoM and the pose of the right foot.

The first pose tracking vector may include a first position tracking vector and a first attitude tracking vector, and the second pose tracking vector may include a second position tracking vector and a second attitude tracking vector.

Figure 5:
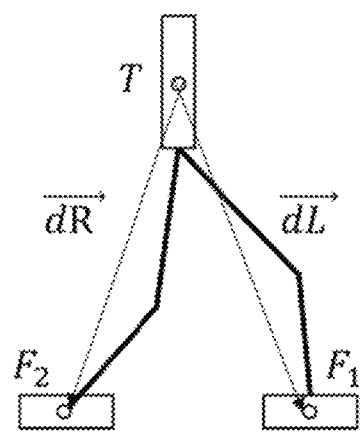
FIG. 5 is a schematic diagram of an actual feet model according to one embodiment.

Regarding the position, in one embodiment, an analysis may be performed based on the actual feet of the robot. The vector from the actual position of the center of mass (CoM) of the robot to the position of the left foot is determined as the first position tracking vector of the robot, and a vector from the actual position of the CoM of the robot to the position of the right foot is determined as the second position tracking vector of the robot. FIG. 5 shows a schematic diagram of the actual feet model of the robot, where T represents the center of mass of the robot, $F_1$ represents the left foot of the robot, $F_2$ represents the right foot of the robot, $\vec{dL}$ represents the vector from the actual position of the center of mass to the position of the left foot, $\vec{DL}=(dL_x, dL_y, dL_z)$, $dL_x$, $dL_y$, and $dL_z$ are the components of the vector on the x-axis, y-axis and z-axis, respectively, $\vec{dR}$ represents the vector from the actual position of the center of mass to the position of the right foot, $\vec{dR}=(dR_x, dR_y, dR_z)$, $dR_x$, $dR_y$, and $dR_z$ are the components of the vector on the x-axis, y-axis and z-axis, respectively.

Figure 6:
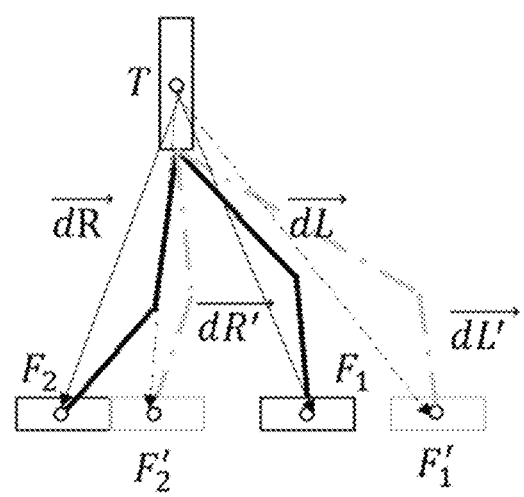
FIG. 6 is a schematic diagram of a virtual feet model according to one embodiment.

In another embodiment, an analysis can be performed based on the virtual feet of the robot. The vector from the actual position of the CoM of the robot to the position of a virtual left foot is determined as the first position tracking vector of the robot, and the vector from the actual position of the CoM of the robot to the position of a virtual right foot is determined as the second position tracking vector of the robot. FIG. 6 shows a schematic diagram of the virtual feet model of the robot, where $F'_1$ represents the virtual left foot, $F'_2$ represents the virtual right foot, $\vec{dL'}$ represents the vector from the actual position of the CoM to the position of the virtual left foot, and $\vec{dL'}=(dL'_x, dL'_y, dL'_z)$, $dL'_x$, $dL'_y$, and $dL'_z$ are the components of the vector on the x-axis, y-axis and z-axis, respectively, $\vec{dR'}$ is the vector from the actual position of the CoM to the position of the virtual right foot, and $\vec{dR'}=(dR'_x, dR'_y, dR'_z)$, $dR'_x$, $dR'_y$, and $dR'_z$ are the components of the vector on the x-axis, y-axis and z-axis, respectively.

The relationship between $\vec{dL'}$ and $\vec{dL}$, and the relationship between $\vec{dR'}$ and $\vec{dR}$ can be set according to the actual situation. For example, in the x-axis direction and the y-axis direction, the relationship can be set as shown in the following equations:

$$dL'_x = a_1 dL_x + b_1;$$

$$dR'_x = a_2 dR_x + b_2;$$

$$dL'_y = a_3 dL_y + b_3;$$

$$dR'_y = a_4 dR_y + b_4;$$

where $a_1$, $b_1$, $a_2$, $b_2$, $a_3$, $b_3$, $a_4$, and $b_4$ are preset parameters, and the specific values of them can be set according to the actual situation.

Figure 7:
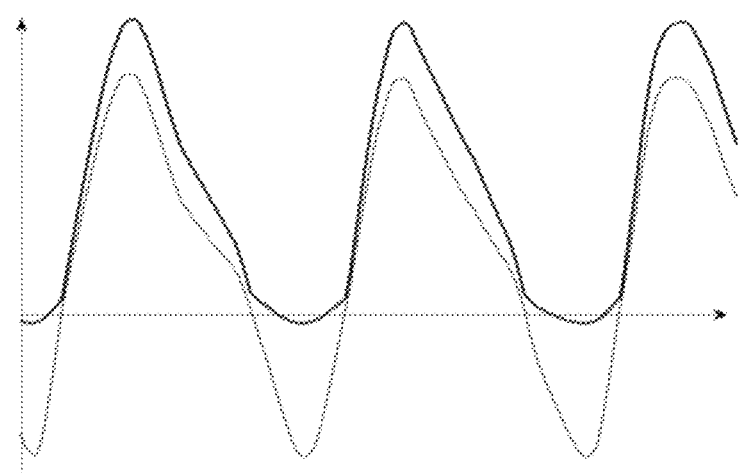
FIG. 7 is a schematic diagram showing the relationship between the actual feet model and the virtual feet model in the x-axis direction and the y-axis direction.

Taking $dL'_x = a_1 dL_x + b_1$ as an example, if a fast CoM tracking is needed during walking of the robot, $b_1$ can be set to a positive value. When $dL_x > 0$ (i.e., the left foot is ahead of the right foot), $a_1$ can be set to a value greater than 1 such that the left foot can be tracked well. When $dL_x \leq 0$ (i.e., the right foot is ahead of the left foot), $a_1$ can be set to a value less than 1 such that the right foot can be tracked well. FIG. 7 shows a schematic diagram of the relationship between $dL_x$ and $dL'_x$, where the horizontal axis is the time axis, and the upper curve is the curve of $dL_x$ changing with time, the lower curve is the curve of $dL'_x$ changing with time, and $dL'_x$ and $dL_x$ have a linear relationship.

Figure 8:
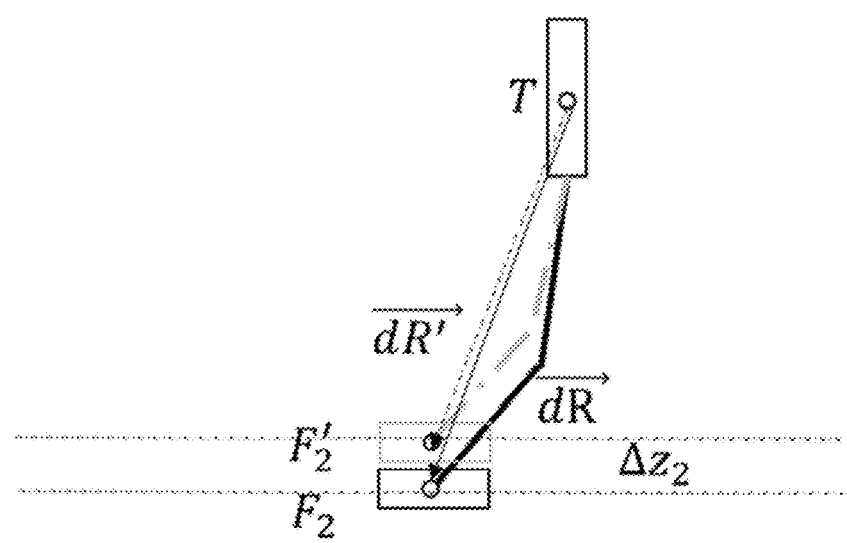
FIG. 8 is a schematic diagram showing the relationship between the actual feet model and the virtual feet model in the z-axis direction.

In the z-axis direction, as shown in FIG. 8, the relationship can be set as shown in the following equations: $dL'_z = dL_z + \Delta z_1$ and $dR'_z = dR_z + \Delta z_2$, where $\Delta z_1$ and $\Delta z_2$ represent preset parameters, and the specific values of them can be set according to the actual situation. For example, the amount of change in position of the left foot and the amount of change in position of the right foot can be calculated based on conventional foot impedance control algorithms, and set them as $\Delta z_1$ and $\Delta z_2$, respectively.

Regarding the attitude, the vector from the actual attitude of the CoM of the robot to the attitude of the left foot can be determined as the first attitude tracking vector of the robot, and the vector from the actual attitude of the CoM of the robot to the attitude of the right foot can be determined as the second attitude tracking vector of the robot.

Here, the vector from the actual attitude of the CoM to the attitude of the left foot is represented by $\vec{dL_r}$, and $\vec{dL_r}=(dL_{rx}, dL_{ry}, dL_{rz})$, where $dL_{rx}$, $dL_{ry}$, and $dL_{rz}$ are the components of the vector in the three rotational directions, respectively, and the quaternion corresponding to this vector is $q_l$. The vector from the actual attitude of the CoM to the attitude of the right foot is represented by $\overrightarrow{dR_r}$, and $\overrightarrow{dR_r}=(dR_{rx}, dR_{ry}, dR_{rz})$, where $dR_{rx}$, $dR_{ry}$, and $dR_{rz}$ are the components of the vector in the three rotational directions, respectively, and the quaternion corresponding to this vector is $q_r$.

Step S303: Control a desired pose of the CoM of the robot to alternately track the pose of the left foot and the pose of the right foot, according to the first pose tracking vector and the second pose tracking vector, so as to generate a desired CoM trajectory of the robot.

Figure 9:
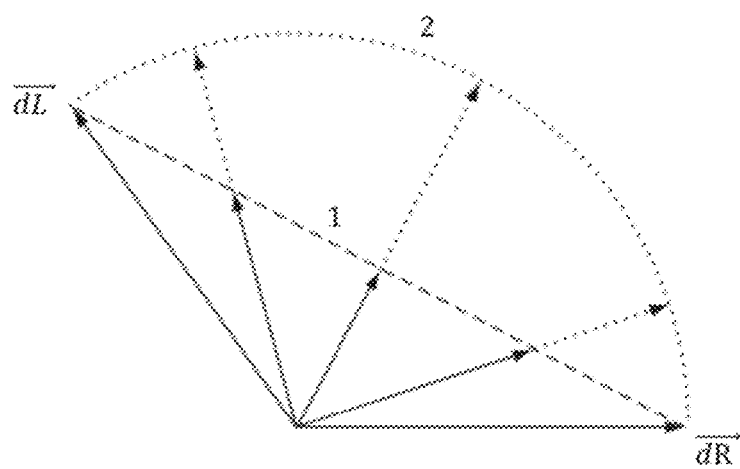
FIG. 9 is a schematic diagram of linear interpolation and spherical interpolation.
Figure 10:
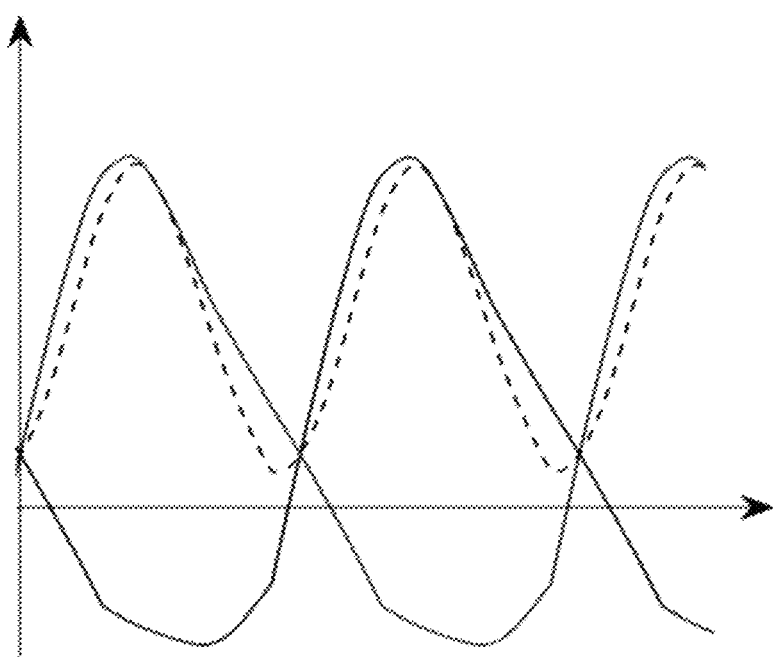
FIG. 10 is a schematic diagram of the desired position of the CoM of the robot alternately tracking the positions of the feet the robot.

There are many paths for the CoM to track the feet alternately. FIG. 9 shows two ideas of linear interpolation (i.e., path 1) and spherical interpolation (i.e., path 2).

Path 1 can be used for position interpolation, but cannot be used for attitude interpolation. Since the arc length near the middle of path 1 is longer, and the arc length near the two ends is shorter, this means that when the time changes uniformly, the angular velocity representing the attitude vector does not change uniformly. Therefore, for the attitude, path 2 can be used for spherical interpolation. When path 2 interpolation is used, the Euler angle attitude is usually converted into a quaternion attitude.

Specifically, in terms of position, the desired position of the CoM of the robot can be controlled to alternately track the position of the left foot and the position of the right foot according to the following equations:

$$x_1 = \frac{1}{2}((dL_x + dR_x) + (dL_x - dR_x)s_1(t));$$

$$y_1 = \frac{1}{2}((dL_y + dR_y) + (dL_y - dR_y)s_2(t));$$

$$z_1 = \frac{1}{2}((dL_z + dR_z) + (dL_z - dR_z)s_3(t));$$

where t represents a time variable, $s_1(t)$, $s_2(t)$ 제$_3$(t) represent preset activation functions, and $(x_1, y_1, z_1)$ represents desired position of the CoM of the robot.

FIG. 9 is a schematic diagram of the desired position of the CoM alternately tracking the positions of the two feet, where the horizontal axis is the time axis. Taking the x-axis direction as an example, the two solid lines are the curves of $dL_x$ and $dR_x$ changing with time, respectively, and the dotted line is the curve of $x_1$ changing with time.

It should be noted that the above process is for the actual feet model. For the virtual feet model, $dL_x$ needs to be replaced with $dL'_x$, $dR_x$ needs to be replaced with $dR'_x$, $dL_y$ needs to be replaced with $dL'_y$, $dR_y$ needs to be replaced with $dR'_y$, $dL_z$ needs to be replaced with $dL'_z$, and $dR_z$ needs to be replaced with $dR'_z$.

Regarding the attitude, the desired attitude of the CoM of the robot can be controlled to alternately track the attitude of the left foot and the attitude of the right foot according to the following equations:

$$q_1 = \frac{q_l \sin((1-s_4(t))^\theta) + q_r \sin(s_4(t)^\theta)}{\sin^\theta}$$

$$q_l^{-1} q_r = (x, y, z, w)$$

$$\theta = 2 * \operatorname{atan2}\left(\sqrt{x^2 + y^2 + z^2}, w\right)$$

where $q_l$ represents a quaternion of the desired attitude of the CoM of the robot, $\theta$ represents the angle between $q_l$ and $q_r$, and $s_4(t)$ represents a preset activation function.

The activation functions used in the embodiments of the present disclosure will be described in detail below. For $s_1(t)$, $s_2(t)$, and $s_3(t)$ for position control, their domain is [0, +∞), and their range is [−1,1]. For $s_4(t)$ for attitude control, the domain is [0, +∞), and the range is [0, 1]. These activation functions are all periodic functions, and their period is the gait cycle of the robot.

In one embodiment, the activation functions can be set according to the following equations:

$$s_1(t) = g_1(t), \quad g_1(t) = \sin(\omega t + \phi_1)$$

$$s_2(t) = g_2(t), \quad g_2(t) = \sin(\omega t + \phi_2)$$

$$s_3(t) = g_3(t), \quad g_3(t) = \sin(\omega t + \phi_3)$$

$$s_4(t) = g_4(t), \quad g_4(t) = \frac{1}{2}\sin(\omega t + \phi_4) + 1$$

where $g_1(t)$, $g_2(t)$, $g_3(t)$, and $g_4(t)$ represent preset original activation functions, $$\omega = \frac{2\pi}{T},$$

T represents a gait cycle of the robot, $\phi_1$, $\phi_2$, $\phi_3$, and $\phi_4$ are preset phases respectively, and their specific values can be set according to actual situations.

A more general description of the generation process of the original activation functions will be made below.

In one embodiment, a monotonically increasing function whose domain and range are both [0, 1] can be used as an activation metafunction. Such functions are generally few, but there are many monotonically increasing functions. Here, a monotonically increasing function defined in a certain interval can be transformed into an activation metafunction through standard transformation. For example, the known function y=h(x) is a monotonic function on the domain $[a_1, a_2]$, and its range is $[b_1, b_2]$. Then its standard transformation is as follows:

$$\begin{cases} x = a_1 + x'(a_2 - a_1) \\ y = h(x) \\ y' = \frac{y - b_1}{b_2 - b_1} \end{cases}.$$

After the transformation above, when x'∈ [0, 1], y'∈ [0, 1].

Figure 11:
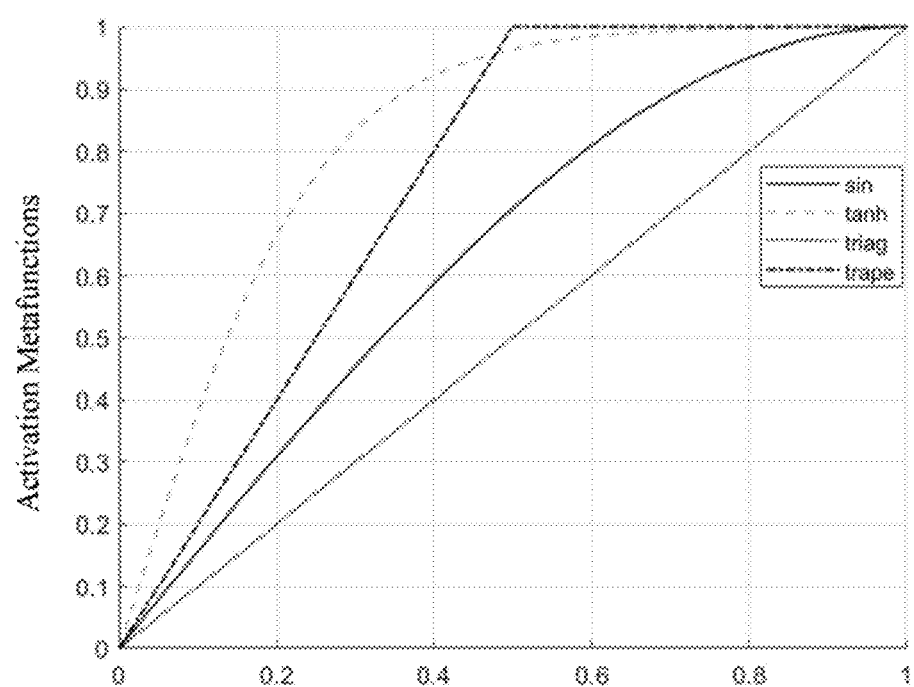
FIG. 11 is a schematic diagram of an activation metafunction obtained by standard transformation using a commonly used function.

FIG. 11 shows the activation metafunctions obtained by standard transformation of several commonly used functions including the sine function (sin), the hyperbolic tangent function (tan h), the trigonometric function (triag) and the trapezoidal function (trape). The activation metafunctions are denoted by $j=f_1(c)$, where c∈ [0, 1], and j∈ [0, 1].

Figure 12:
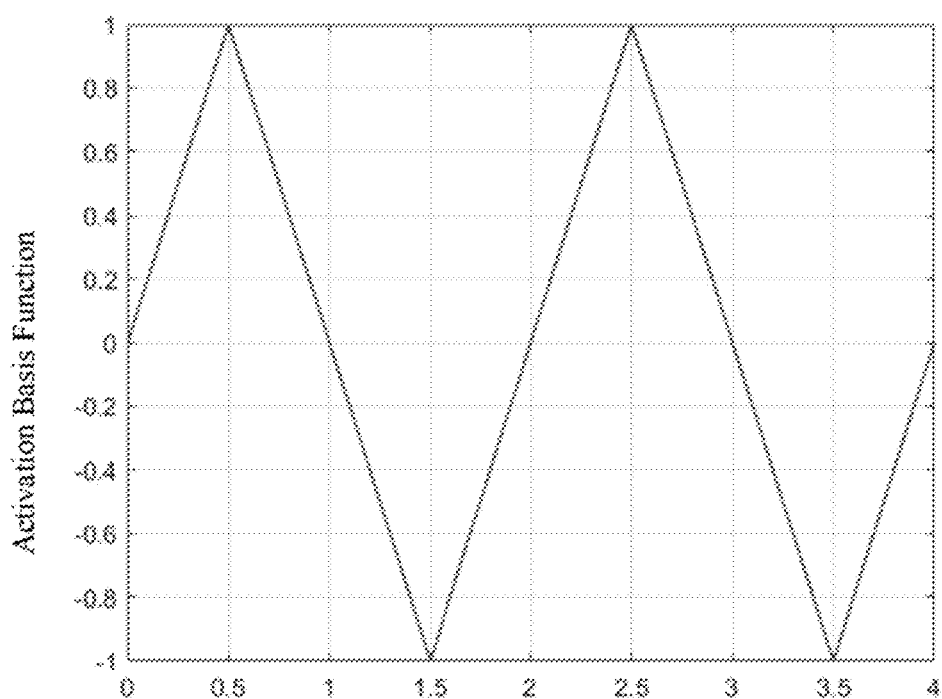
FIG. 12 is a schematic diagram of an activation basis function.

In one embodiment, the activation basis function $s=f_2(t, T, \phi)$ may be used to transform an activation metafunction into an original activation function. FIG. 12 shows the excitation basis function with a period of T=2 and a phase of $\phi$=0.

The general original excitation function can be expressed as $g(t)=\operatorname{sign}(s)f_1(|s|)$. An intermediate state s can be calculated by substituting the time t, period T and phase φ into the activation basis function, and the original activation function can be calculated by substituting the sign function sign(s) of the intermediate state s and the absolute value |s| into the activation metafunction.

Figure 13:
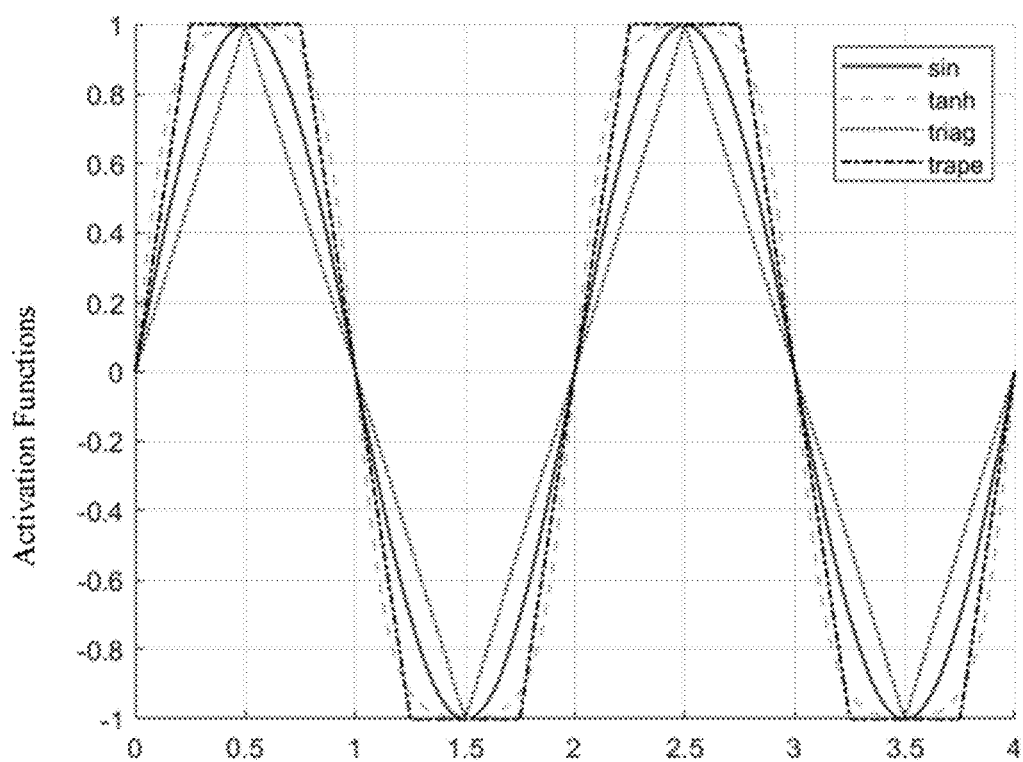
FIG. 13 is a schematic diagram of the original activation functions corresponding to activation metafunctions in FIG. 11.
Figure 14:
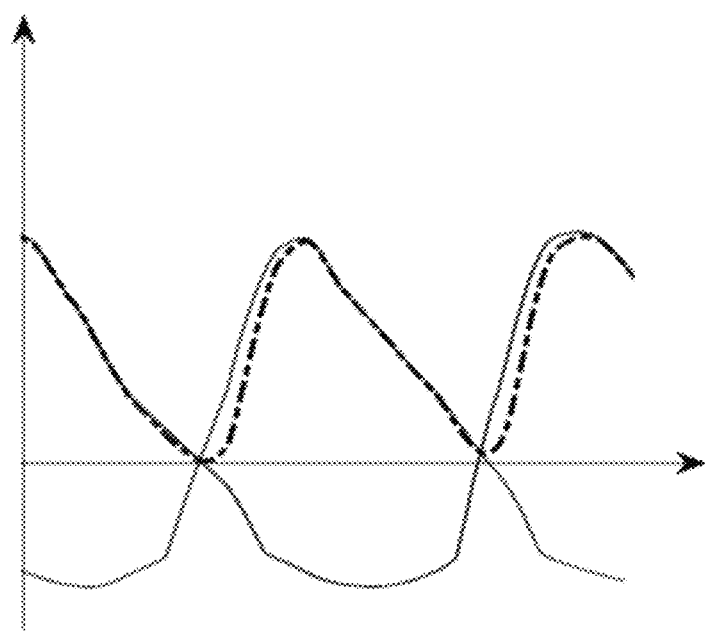
FIG. 14 is a schematic diagram of CoM tracking when the hyperbolic tangent function is activated.

FIG. 13 is a schematic diagram of the original activation functions corresponding to the activation metafunctions in FIG. 11. It can be seen from the figure that the proportion of the four curves is between 0.8 and 1, the hyperbolic tangent activation curve has the longest time, and the triangular activation curve is the shortest. The longer the proportion of time, the closer to the peak value. The closer to the peak value, the longer the center of mass is in the position near the feet, and the shorter the time in the middle of the two feet, indicating that the tracking effect of the center of mass is satisfactory.

In another embodiment, activation functions can also be set according to the following equations:

$$s1(t)=g1(t)*\text{flag}$$

$$s2(t)=g2(t)*\text{flag}$$

$$s3(t)=g3(t)*\text{flag}$$

$$s4(t)=g4(t)*\text{flag}$$

$$\text{flag} = \begin{cases} 1, t \le N*T/2 \\ 0, t > N*T/2 \end{cases}$$

where N is the preset number of steps of the robot, and its specific value can be set according to the actual situation. In this way, the robot can be controlled to stop quickly when the number of steps reaches the preset number, which is more suitable for situations that require precise walking, such as humanoid robot performances on large stages.

By implementing the method including steps S301 to S303 disclosed in the embodiments above, the CoM trajectory is generated according to the control idea of CoM alternately tracking the feet, which effectively improves the stability of the robot.

It should be understood that in the embodiments of the present disclosure, sequence numbers of steps do not mean an execution order. The execution order of the steps should be determined according to functions and internal logic of the steps, and should not be construed as any limitation on the implementation processes of the embodiments of the present disclosure.

Corresponding to the method for generating a CoM trajectory described in the embodiments above, FIG. 15 shows a block diagram of a CoM trajectory generating device according to an embodiment of the present disclosure.

In one embodiment, the CoM trajectory generating device may include a pose determining module 1401, a pose tracking vector determining module 1402, and a tracking module 1403. The pose determining module 1401 is to determine the actual pose of the CoM, the pose of the left foot, and the pose of the right pose of a robot. The pose tracking vector determining module 1402 is to determine a first pose tracking vector of the robot according to the actual pose of the CoM and the pose of the left foot, and determine a second pose tracking vector of the robot according to the actual pose of the CoM and the pose of the right foot. The tracking module 1403 is to control a desired pose of the CoM of the robot to alternately track the pose of the left foot and the pose of the right foot, according to the first pose tracking vector and the second pose tracking vector, so as to generate a desired CoM trajectory of the robot.

In one embodiment, the tracking module 1403 may include a position tracking unit. The position tracking unit is to controlling a desired position of the CoM of the robot to alternately track a position of the left foot and a position of the right foot according to the following equations:

$$x_1 = \frac{1}{2}((dL_x + dR_x) + (dL_x - dR_x)s_1(t))$$

$$y_1 = \frac{1}{2}((dL_y + dR_y) + (dL_y - dR_y)s_2(t))$$

$$z_1 = \frac{1}{2}((dL_z + dR_z) + (dL_z - dR_z)s_3(t))$$

where $(dL_x, dL_y, dL_z)$ represents a first position tracking vector of the robot, $(dR_x, dR_y, dR_z)$ represents a second position tracking vector of the robot, t represents a time variable, $s_1(t)$, $s_2(t)$ 和 $s_3(t)$ represent preset activation functions, and $(x_1, y_1, z_1)$ represents desired position of the CoM of the robot.

In one embodiment, the activation functions are set according to the following equations:

$$s1(t)=g1(t)*\text{flag}$$

$$s2(t)=g2(t)*\text{flag}$$

$$s3(t)=g3(t)*\text{flag}$$

$$\text{flag} = \begin{cases} 1, t \le N*T/2 \\ 0, t > N*T/2 \end{cases}$$

where $g_1(t)$, $g_2(t)$ 和 $g_3(t)$ represent preset original activation functions, N represents a preset number of steps of the robot, and T represents a gait cycle of the robot.

In one embodiment, the pose tracking vector determining module 1402 may include a first position tracking vector determining unit and a second position tracking vector determining unit. The first position tracking vector determining unit is to determine a vector from an actual position of the CoM to a position of the left foot as a first position tracking vector of the robot. The second position tracking vector determining unit is to determining a vector from an actual position of the CoM to a position of the right foot as a second position tracking vector of the robot.

In one embodiment, the pose tracking vector determining module 1402 may further include a first position tracking vector correcting unit and a second t position tracking vector correcting unit. The first position tracking vector correcting unit is to correct the first position tracking vector of the robot to obtain a first corrected position tracking vector according to the following equations:

$$dL'_x = a_1 dL_x + b_1;$$

$$dL'_y = a_3 dL_y + b_3;$$

$$dL'_z = dL_z + \Delta z_1;$$

where $(dL_x, dL_y, dL_z)$ represents the first position tracking vector, $a_1$, $b_1$, $a_3$, $b_3$, and $\Delta z_1$ represent preset parameters, and $(dL'_x, dL'_y, dL'_z)$ represents the first corrected position tracking vector.

The second position tracking vector correcting unit is to correct the second position tracking vector of the robot to obtain a second corrected position tracking vector according to the following equations:

$$dR'_x = a_2 dR_x + b_2;$$

$$dR'_y = a_4 dR_y + b_4;$$

$$dR'_z = dR_z + \Delta z_2;$$

where $(dR_x, dR_y, dR_z)$ represents the second position tracking vector, $a_2$, $b_2$, $a_4$, $b_4$, and $\Delta z_2$ represent preset parameters, and $(dR'_x, dR'_y, dR'_z)$ represents the second corrected position tracking vector.

In one embodiment, the pose tracking vector determining module 1402 may include a first attitude tracking vector determining unit and a second attitude tracking vector determining unit. The first attitude tracking vector is to determine a vector from an actual attitude of the CoM of the robot to an attitude of the left foot as a first attitude tracking vector of the robot. The second attitude tracking vector determining unit is to determine a vector from the actual attitude of the CoM to an attitude of the right foot as a second attitude tracking vector of the robot.

The tracking module may include an attitude tracking unit that is to control the desired attitude of the CoM of the robot to alternately track the attitude of the left foot and the attitude of the right foot according to the following equation:

$$q_1 = \frac{q_l \sin((1 - s_4(t))\theta) + q_r \sin(s_4(t)\theta)}{\sin\theta}$$

where $q_l$ represents a quaternion of the first attitude tracking vector of the robot, $q_r$ represents a quaternion of the second attitude tracking vector of the robot, $\theta$ represents the angle between $q_l$ and $q_r$, t represents a time variable, $s_4(t)$ represents a preset activation function, and $q_1$ represents a quaternion of the desired attitude of the CoM of the robot. In one embodiment, the activation function is set according to the following equations:

$$s_4(t) = g_4(t) * \text{flag};$$

$$\text{flag} = \begin{cases} 1, t \leq N * T/2 \\ 0, t > N * T/2 \end{cases};$$

where $g_4(t)$ represents a preset original activation function, N represents a preset number of steps of the robot, and T represents a gait cycle of the robot.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method for generating a center of mass (CoM) trajectory, comprising:
   determining an actual pose of a center of mass (CoM), a pose of a left foot, and a pose of a right pose of a robot;
   determining a first pose tracking vector of the robot according to the actual pose of the CoM and the pose of the left foot, and determining a second pose tracking vector of the robot according to the actual pose of the CoM and the pose of the right foot; and
   controlling a desired pose of the CoM of the robot to alternately track the pose of the left foot and the pose of the right foot, according to the first pose tracking vector and the second pose tracking vector, so as to generate a desired CoM trajectory of the robot.

2. The method of claim 1, wherein controlling the desired pose of the CoM of the robot to alternately track the pose of the left foot and the pose of the right foot, according to the first pose tracking vector and the second pose tracking vector, so as to generate the desired CoM trajectory of the robot, comprises:
   controlling a desired position of the CoM of the robot to alternately track a position of the left foot and a position of the right foot according to the following equations:

$$x_1 = \frac{1}{2}((dL_x + dR_x) + (dL_x - dR_x)s_1(t));$$

$$y_1 = \frac{1}{2}((dL_y + dR_y) + (dL_y - dR_y)s_2(t));$$

$$z_1 = \frac{1}{2}((dL_z + dR_z) + (dL_z - dR_z)s_3(t));$$

where $(dL_x, dL_y, dL_z)$ represents a first position tracking vector of the robot, $(dR_x, dR_y, dR_z)$ represents a second position tracking vector of the robot, t represents a time variable, $s_1(t)$, $s_2(t)$, and $s_3(t)$ represent preset activation functions, and $(x_1, y_1, z_1)$ represents desired position of the CoM of the robot.

3. The method of claim 2, wherein the activation functions are set according to the following equations:

$$s1(t) = g1(t) * \text{flag};$$

$$s2(t) = g2(t) * \text{flag};$$

$$s3(t) = g3(t) * \text{flag};$$

$$\text{flag} = \begin{cases} 1, t \le N*T/2 \\ 0, t > N*T/2 \end{cases};$$

where $g_1(t)$, $g_2(t)$, and $g_3(t)$ represent preset original activation functions, N represents a preset number of steps of the robot, and T represents a gait cycle of the robot.

4. The method of claim 1, wherein determining the first pose tracking vector of the robot according to the actual pose of the CoM and the pose of the left foot comprises:
   determining a vector from an actual position of the CoM to a position of the left foot as a first position tracking vector of the robot; and
   wherein determining the second pose tracking vector of the robot according to the actual pose of the CoM and the pose of the right foot comprises: determining a vector from the actual position of the CoM to a position of the right foot as a second position tracking vector of the robot.

5. The method of claim 4, further comprising, after determining the vector from the actual position of the CoM to the position of the left foot as the first position tracking vector of the robot, correcting the first position tracking vector of the robot to obtain a first corrected position tracking vector according to the following equations:

$$dL'_x = a_1 dL_x + b_1;$$

$$dL'_y = a_3 dL_y + b_3;$$

$$dL'_z = dL_z + \Delta z_1;$$

and comprising, after determining the vector from the actual position of the CoM to the position of the right foot as the second position tracking vector of the robot, correcting the second position tracking vector of the robot to obtain a second corrected position tracking vector according to the following equations:

$$dR'_x = a_2 dR_x + b_2;$$

$$dR'_y = a_4 dR_y + b_4;$$

$$dR'_z = dR_z + \Delta z_2;$$

where $(dL_x, dL_y, dL_z)$ represents the first position tracking vector, $a_1$, $b_1$, $a_3$, $b_3$, and $\Delta z_1$ represent preset parameters, and $(dL'_x, dL'_y, dL'_z)$ represents the first corrected position tracking vector; $(dR_x, dR_y, dR_z)$ represents the second position tracking vector, $a_2$, $b_2$, $a_4$, $b_4$, and $\Delta z_2$ represent preset parameters, and $(dR'_x, dR'_y, dR'_z)$ represents the second corrected position tracking vector.

6. The method of claim 1, wherein determining the first pose tracking vector of the robot according to the actual pose of the CoM and the pose of the left foot comprises determining a vector from an actual attitude of the CoM of the robot to an attitude of the left foot as a first attitude tracking vector of the robot;

wherein determining the second pose tracking vector of the robot according to the actual pose of the CoM and the pose of the right foot comprises determining a vector from the actual attitude of the CoM to an attitude of the right foot as a second attitude tracking vector of the robot;

wherein controlling the desired pose of the CoM of the robot to alternately track the pose of the left foot and the pose of the right foot, according to the first pose tracking vector and the second pose tracking vector, so as to generate the desired CoM trajectory of the robot, comprises: controlling the desired attitude of the CoM of the robot to alternately track the attitude of the left foot and the attitude of the right foot according to the following equation:

$$q_1 = \frac{q_l \sin((1-s_4(t))\theta) + q_r \sin(s_4(t)\theta)}{\sin\theta}$$

where $q_l$ represents a quaternion of the first attitude tracking vector of the robot, $q_r$ represents a quaternion of the second attitude tracking vector of the robot, $\theta$ represents the angle between $q_l$ and $q_r$, t represents a time variable, $s_4(t)$ represents a preset activation function, and $q_1$ represents a quaternion of the desired attitude of the CoM of the robot.

7. The method of claim 6, wherein the activation function is set according to the following equations:

$$s_4(t) = g_4(t) * \text{flag};$$

$$\text{flag} = \begin{cases} 1, & t \leq N * T/2 \\ 0, & t > N * T/2 \end{cases};$$

where $g_4(t)$ represents a preset original activation function, N represents a preset number of steps of the robot, and T represents a gait cycle of the robot.

8. A robot comprising:
   a left foot;
   a right foot;
   one or more processors; and
   a memory coupled to the one or more processors, the memory storing programs that, when executed, cause the one or more processors to:
      determine an actual pose of a center of mass (CoM), a pose of a left foot, and a pose of a right pose of a robot;
      determine a first pose tracking vector of the robot according to the actual pose of the CoM and the pose of the left foot, and determine a second pose tracking vector of the robot according to the actual pose of the CoM and the pose of the right foot; and
      control a desired pose of the CoM of the robot to alternately track the pose of the left foot and the pose of the right foot, according to the first pose tracking vector and the second pose tracking vector, so as to generate a desired CoM trajectory of the robot.

9. The robot of claim 8, wherein, to control the desired pose of the CoM of the robot to alternately track the pose of the left foot and the pose of the right foot, according to the first pose tracking vector and the second pose tracking vector, so as to generate the desired CoM trajectory of the robot, the programs, when executed, further cause the one or more processors to:
   control a desired position of the CoM of the robot to alternately track a position of the left foot and a position of the right foot according to the following equations:

$$x_1 = \frac{1}{2}((dL_x + dR_x) + (dL_x - dR_x)s_1(t));$$

$$y_1 = \frac{1}{2}((dL_y + dR_y) + (dL_y - dR_y)s_2(t));$$

$$z_1 = \frac{1}{2}((dL_z + dR_z) + (dL_z - dR_z)s_3(t));$$

where $(dL_x, dL_y, dL_z)$ represents a first position tracking vector of the robot, $(dR_x, dR_y, dR_z)$ represents a second position tracking vector of the robot, t represents a time variable, $s_1(t)$, $s_2(t)$, and $s_3(t)$ represent preset activation functions, and $(x_1, y_1, z_1)$ represents desired position of the CoM of the robot.

10. The robot of claim 9, wherein the activation functions are set according to the following equations:

$$s1(t)=g1(t)*\text{flag};$$

$$s2(t)=g2(t)*\text{flag};$$

$$s3(t)=g3(t)*\text{flag};$$

$$\text{flag} = \begin{cases} 1, & t \leq N * T/2 \\ 0, & t > N * T/2 \end{cases};$$

where $g_1(t)$, $g_2(t)$, and $g_3(t)$ represent preset original activation functions, N represents a preset number of steps of the robot, and T represents a gait cycle of the robot.

11. The robot of claim 8, wherein, to determine the first pose tracking vector of the robot according to the actual pose of the CoM and the pose of the left foot, the programs, when executed, further cause the one or more processors to determine a vector from an actual position of the CoM to a position of the left foot as a first position tracking vector of the robot, and wherein, to determine the second pose tracking vector of the robot according to the actual pose of the CoM and the pose of the right foot, the programs, when executed, further cause the one or more processors to determine a vector from the actual position of the CoM to a position of the right foot as a second position tracking vector of the robot.

12. The robot of claim 11, wherein the programs, when executed, further cause the one or more processors to, after determining the vector from the actual position of the CoM to the position of the left foot as the first position tracking vector of the robot, correct the first position tracking vector of the robot to obtain a first corrected position tracking vector according to the following equations:

$$dL'_x = a_1 dL_x + b_1;$$

$$dL'_y = a_3 dL_y + b_3;$$

$$dL'_z = dL_z + \Delta z_1;$$

and the programs, when executed, further cause the one or more processors to, after determining the vector from the actual position of the CoM to a position of the right foot as a second position tracking vector of the robot, correct the second position tracking vector of the robot to obtain a second corrected position tracking vector according to the following equations:

$$dR'_x = a_2 dR_x + b_2;$$

$$dR'_y = a_4 dR_y + b_4;$$

$$dR'_z = dR_z + \Delta z_2;$$

where $(dL_x, dL_y, dL_z)$ represents the first position tracking vector, $a_1$, $b_1$, $a_3$, $b_3$, and $\Delta z_1$ represent preset parameters, and $(dL'_x, dL'_y, dL'_z)$ represents the first corrected position tracking vector; $(dR_x, dR_y, dR_z)$ represents the second position tracking vector, $a_2$, $b_2$, $a_4$, $b_4$, and $\Delta z_2$ represent preset parameters, and $(dR'_x, dR'_y, dR'_z)$ represents the second corrected position tracking vector.

13. The robot of claim 8, wherein, to determine the first pose tracking vector of the robot according to the actual pose of the CoM and the pose of the left foot, the programs, when executed, further cause the one or more processors to determine a vector from an actual attitude of the CoM of the robot to an attitude of the left foot as a first attitude tracking vector of the robot;
wherein, to determine the second pose tracking vector of the robot according to the actual pose of the CoM and the pose of the right foot, the programs, when executed, further cause the one or more processors to determine a vector from the actual attitude of the CoM to an attitude of the right foot as a second attitude tracking vector of the robot;
wherein, to control the desired pose of the CoM of the robot to alternately track the pose of the left foot and the pose of the right foot, according to the first pose tracking vector and the second pose tracking vector, so as to generate the desired CoM trajectory of the robot, the programs, when executed, further cause the one or more processors to control the desired attitude of the CoM of the robot to alternately track the attitude of the left foot and the attitude of the right foot according to the following equation:

$$q_1 = \frac{q_l \sin((1-s_4(t))\theta) + q_r \sin(s_4(t)\theta)}{\sin\theta}$$

where $q_l$ represents a quaternion of the first attitude tracking vector of the robot, $q_r$ represents a quaternion of the second attitude tracking vector of the robot, $\theta$ represents the angle between $q_l$ and $q_r$, t represents a time variable, $s_4(t)$ represents a preset activation function, and $q_1$ represents a quaternion of the desired attitude of the CoM of the robot.

14. The robot of claim 13, wherein the activation function is set according to the following equations:

$$s_4(t) = g_4(t) * \text{flag};$$

$$\text{flag} = \begin{cases} 1, & t \le N*T/2 \\ 0, & t > N*T/2 \end{cases};$$

where $g_4(t)$ represents a preset original activation function, N represents a preset number of steps of the robot, and T represents a gait cycle of the robot.

15. A non-transitory computer-readable medium storing instructions that, when executed by at least one processor, cause the at least one processor to perform a method for generating a center of mass (CoM) trajectory, the method comprising:
determining an actual pose of a center of mass (CoM), a pose of a left foot, and a pose of a right pose of a robot,
determining a first pose tracking vector of the robot according to the actual pose of the CoM and the pose of the left foot, and determining a second pose tracking vector of the robot according to the actual pose of the CoM and the pose of the right foot; and
controlling a desired pose of the CoM of the robot to alternately track the pose of the left foot and the pose of the right foot, according to the first pose tracking vector and the second pose tracking vector, so as to generate a desired CoM trajectory of the robot.

16. The non-transitory computer-readable medium of claim 15, wherein controlling the desired pose of the CoM of the robot to alternately track the pose of the left foot and the pose of the right foot, according to the first pose tracking vector and the second pose tracking vector, so as to generate the desired CoM trajectory of the robot, comprises:
controlling a desired position of the CoM of the robot to alternately track a position of the left foot and a position of the right foot according to the following equations:

$$x_1 = \frac{1}{2}((dL_x + dR_x) + (dL_x - dR_x)s_1(t));$$

$$y_1 = \frac{1}{2}((dL_y + dR_y) + (dL_y - dR_y)s_2(t));$$

$$z_1 = \frac{1}{2}((dL_z + dR_z) + (dL_z - dR_z)s_3(t));$$

where $(dL_x, dL_y, dL_z)$ represents a first position tracking vector of the robot, $(dR_x, dR_y, dR_z)$ represents a second position tracking vector of the robot, t represents a time variable, $s_1(t)$, $s_2(t)$, and $s_3(t)$ represent preset activation functions, and $(x_1, y_1, z_1)$ represents desired position of the CoM of the robot.

17. The non-transitory computer-readable medium of claim 16, wherein the activation functions are set according to the following equations:

$$s_1(t) = g_1(t) * \text{flag};$$

$$s_1(t) = g_2(t) * \text{flag};$$

$$s_1(t) = g_3(t) * \text{flag};$$

$$\text{flag} = \begin{cases} 1, & t \le N*T/2 \\ 0, & t > N*T/2 \end{cases};$$

where $g_1(t)$, $g_2(t)$, and $g_3(t)$ represent preset original activation functions, N represents a preset number of steps of the robot, and T represents a gait cycle of the robot.

18. The non-transitory computer-readable medium of claim 15, wherein determining the first pose tracking vector of the robot according to the actual pose of the CoM and the pose of the left foot comprises: determining a vector from an actual position of the CoM to a position of the left foot as a first position tracking vector of the robot; and
wherein determining the second pose tracking vector of the robot according to the actual pose of the CoM and the pose of the right foot comprises: determining a vector from the actual position of the CoM to a position of the right foot as a second position tracking vector of the robot.

19. The non-transitory computer-readable medium of claim 18, further comprising, after determining the vector from the actual position of the CoM to the position of the left foot as the first position tracking vector of the robot, correcting the first position tracking vector of the robot to obtain a first corrected position tracking vector according to the following equations:

$dL'_x = a_1 dL_x + b_1$;

$dL'_y = a_3 dL_y + b_3$;

$dL'_z = dL_z + \Delta z_1$;

and comprising, after determining the vector from the actual position of the CoM to the position of the right foot as the second position tracking vector of the robot, correcting the second position tracking vector of the robot to obtain a second corrected position tracking vector according to the following equations:

$dR'_x = a_2 dR_x + b_2$;

$dR'_y = a_4 dR_y + b_4$;

$dR'_z = dR_z + \Delta z_2$;

where ($dL_x$, $dL_y$, $dL_z$) represents the first position tracking vector, $a_1$, $b_1$, $a_3$, $b_3$, and $\Delta z_1$ represent preset parameters, and ($dL'_x$, $dL'_y$, $dL'_z$) represents the first corrected position tracking vector; ($dR_x$, $dR_y$, $dR_z$) represents the second position tracking vector, $a_2$, $b_2$, $a_4$, $b_4$, and $\Delta z_2$ represent preset parameters, and ($dR'_x$, $dR'_y$, $dR'_z$) represents the second corrected position tracking vector.

20. The non-transitory computer-readable medium of claim 15, wherein determining the first pose tracking vector of the robot according to the actual pose of the CoM and the pose of the left foot comprises determining a vector from an actual attitude of the CoM of the robot to an attitude of the left foot as a first attitude tracking vector of the robot;

wherein determining the second pose tracking vector of the robot according to the actual pose of the CoM and the pose of the right foot comprises determining a vector from the actual attitude of the CoM to an attitude of the right foot as a second attitude tracking vector of the robot;

wherein controlling the desired pose of the CoM of the robot to alternately track the pose of the left foot and the pose of the right foot, according to the first pose tracking vector and the second pose tracking vector, so as to generate the desired CoM trajectory of the robot, comprises: controlling the desired attitude of the CoM of the robot to alternately track the attitude of the left foot and the attitude of the right foot according to the following equation:

$$q_1 = \frac{q_l \sin((1 - s_4(t))\theta) + q_r \sin(s_4(t)\theta)}{\sin\theta}$$

where $q_l$ represents a quaternion of the first attitude tracking vector of the robot, $q_r$ represents a quaternion of the second attitude tracking vector of the robot, $\theta$ represents the angle between $q_l$ and $q_r$, t represents a time variable, $s_4(t)$ represents a preset activation function, and $q_1$ represents a quaternion of the desired attitude of the CoM of the robot.

\* \* \* \* \*